Oct. 20, 1959 C. S. CORNWELL Re. 24,723

BUILDING STRUCTURES

Original Filed May 6, 1955 3 Sheets-Sheet 1

INVENTOR

Carlyle S. Cornwell

BY Shoemaker & Mattare

ATTORNEYS

BUILDING STRUCTURES

Original Filed May 6, 1955 3 Sheets-Sheet 2

INVENTOR
Carlyle S. Cornwell
BY Shoemaker & Mattare
ATTORNEYS

BUILDING STRUCTURES

Original Filed May 6, 1955 3 Sheets-Sheet 3

INVENTOR.
Carlyle S. Cornwell
BY Shoemaker & Mattare
ATTYS.

United States Patent Office

Re. 24,723
Reissued Oct. 20, 1959

24,723

BUILDING STRUCTURES

Carlyle S. Cornwell, Shelby, N.C.

Original No. 2,822,583, dated February 11, 1958, Serial No. 506,606, May 6, 1955. Application for reissue March 10, 1958, Serial No. 720,517

9 Claims. (Cl. 20—1.6)

Matter enclosed in heavy brackets [ ] appears in the original patent but forms no part of this reissue specification; matter printed in italics indicates the additions made by reissue.

This invention relates to building structures and has to do primarily with a building structure specifically configurated to accommodate numerous types of businesses for the purpose of permitting goods or articles to be delivered directly to a customer seated in his car.

It is well known that, presently, a great problem exists in accommodating the numerous automobiles present in shopping sections in that, in most such sections, the parking facilities are woefully inadequate. Most business establishments must provide some parking area or space to permit the potential customers to park their automobiles while doing business in the establishment and, for this reason, corner lot sites are usually most desirable inasmuch as they permit the location of a parking lot which has at least two entrances intersecting thoroughfares. One way to alleviate the parking problem in connection with those establishments wherein goods are placed for service and later picked up is to speed up the placing and picking up operations to such an extent that the customer need not park his automobile but for a very short period of time. If this can be carried out to such an extent that the customer need not leave his automobile, it will be obvious that any ordinary parking problems become practically non-existent.

It is, accordingly, a primary object of this invention to provide a building structure which permits placement and pick-up of articles or goods such as clothing in connection with laundry service which will permit the potential customer to drive directly to a placing point or pick-up point and without leaving his or her automobile place or pick-up the goods.

Another object of this invention is to provide an improved building structure of the character described which is particularly suitable for location in a mid-block area resulting in the utilization of normally less valuable property.

Still another object of this invention is to provide a building construction which will permit the operation of business such as a laundry in which the time required to serve the customers will in most instances range from between thirty seconds to two minutes, without the customers having to leave their automobiles, and wherein the quantity of business transacted can be increased above and beyond that which is normally done in an establishment of the same size.

Still another object of this invention is to provide an improved building construction which will permit the transaction of business with faster and more efficient service which ultimately will result in lower prices to the customer and higher profits to the operator as well as the better utilization of commercial property, less congestion in shopping areas and alleviation of the acute parking problem.

A further object of this invention is to provide an improved building structure which incorporates a protruding wall portion which projects partially into or adjacent to a driveway to permit an employee of a business establishment to be located very close to an automobile passing along the thoroughfare and wherein a sliding counter is utilized which is under the control of the employee so as to be engageable with an automobile mometarily parked in the driveway.

Another object of the invention is to provide an improved building construction having one or more bay window assemblies incorporated therein in which is embodied a sliding counter member for projection into close adjacency to a parked automobile for the purpose of serving a customer within such automobile and wherein the bay window additionally incorporates a sliding door on one side thereof for easy access to goods placed within a portion of the bay window assemblage.

Still another object of the invention is to provide a building construction in accordance with the preceding object wherein an inclined hanging rack is associated with the bay window assemblage for conveniently positioning the suspended articles adjacent the sliding door for easy pick-up by the customer.

Another object of this invention is to provide a prefabricated unit which incorporates a frame structure having associated therewith a sliding window and a sliding counter member movable through the window opening for the purpose of permitting a substantially direct attendant-customer contact wherein the prefabricated unit may be utilized as a base of construction for converting a normal business establishment to one in which the substantially direct attendant-customer contact may be had.

Still another object of this invention resides in the provision of a prefabricated unit containing the essential elements to practice a drive-in shopping arrangement.

A further object of the invention is to provide a structure incorporating a window opening and a slidable window associated therewith as well as a slidable counter member which may be projected through the window opening wherein the slidable counter member is connected to the slidable window in such a manner that the window will open when the counter is projected outwardly of the structure through the window opening.

Figure 5:
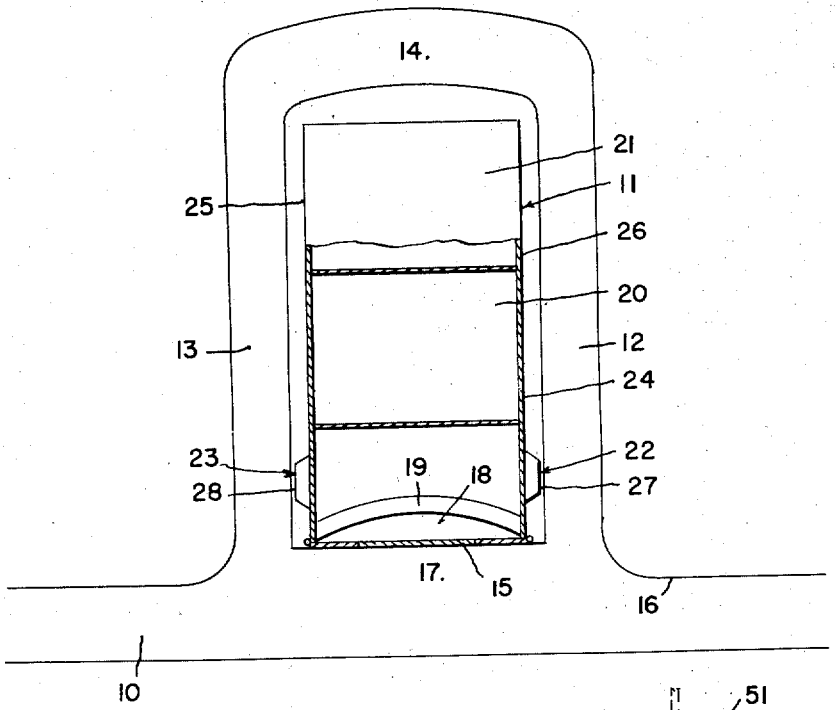
Fig. 5 is a plan partially in section of the entire building construction.

Referring now more particularly to Fig. 5 wherein a plan view of the entire building assemblage is shown, the reference numeral 10 indicates a public thoroughfare, highway, etc., and the reference numeral 11 indicates generally the building structure constructed in accordance with this invention. It will be noted that the building 11 is relatively narrow in frontage so as to use as little frontage as possible and that the building has on either side thereof the alleys or driveways 12 and 13 as well as an alley or driveway connecting the side driveways in the rear thereof as indicated by the reference character 14. Additionally, it will be noted that, preferably, the front 15 of the building is placed somewhat in back of the sidewalk line which is indicated generally by the reference character 16, so as to provide a small space 17 in front of the building within which automobiles may be parked. Preferably, this area 17 is of such extent as to allow several cars to be angled or diagonally parked in front of the establishment.

The front of the establishment is, of course, provided with suitable access doorways and associated doors and the floor space 18 immediately behind the front of the building provides suitable space for the customers to enter and leave the establishment while transacting their business at the arcuate counter 19. Of course, immediately behind the counter 19, there is provided aisle space for the attendants or employees and it is preferred that the space immediately to the rear of this aisle space which is indicated generally by the reference character 20 be utilized for the purpose of storing the goods or articles such as clothing in the case of a laundry or dry cleaning establishment.

The extreme rear area 21 of the building may conveniently be used for the processing plant, if the establishment is a laundry or dry cleaning plant and establishment, or the area 21 may be utilized for workers repairing articles if the building is to be utilized for other businesses.

Reference numerals 22 and 23 indicate generally bay window projections on the opposite side walls 24 and 25 of the building and it will be noted that these projections extend somewhat into the area of the driveways 12 and 13 so that the front wall partions 27 and 28 thereof are disposed so that an automobile on the side driveways may be parked close to such front wall portions.

Preferably a unidirectional flow of traffic will be permitted through the driveway extending around the building 11 and it may be preferred that one of the bay window assemblies, say for example 22, may be used by customers wishing [a] *to* place goods for service whereas the other bay window assembly 23 may be used for customers desiring to pick up goods which have already been processed. Of course, other locations of the bay windows 22 and 23 may be utilized which will accomplish the most effective utilization of the space available and which will permit a rapid and substantially continuous flow of traffic around the building.

Figure 1:
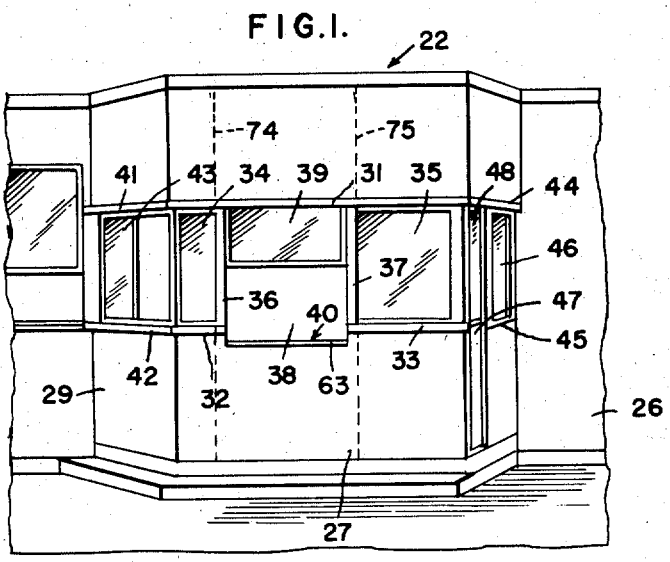
Fig. 1 is a perspective view of a portion of a building constructed in accordance with this invention and illustrating the bay window construction thereof.

Referring now more particularly to Fig. 1, the bay window assembly 22 will be seen to be formed from the previously mentioned front wall portion 27 and in addition thereto the side wall portions 29 and 30 which are mutually convergent toward the front wall.

In the front wall 27 is disposed an elongate and continuous lintle 31 and an interrupted sill construction 32—33 which define a window opening in which the window assemblies 34 and 35 are fixedly placed with the adjacent edges 36 and 37 of such window assemblies being spaced apart to define a service opening 38 therebetween. The service opening 38 has associated therewith a sliding window unit 39 and in the lower region thereof there is placed a sliding counter which is indicated generally by the reference character 40 in Fig. 1.

The side wall portion 29 has an elongate lintle construction 41 which forms a continuation on one side of the lintle 31 and has a sill portion 42 forming a continuation of the sill portion 32 on the front wall with the space defined therebetween closed by a transparent window assembly 43 or by a plurality of windows. In any event, it is desired that a maximum of visibility be provided for an attendant within the bay window assembly.

The side wall portion 30 provided with a lintle portion 44 which forms an extension of the previously mentioned lintle 31 and spaced therebelow to extend across a portion of the side wall 30 adjacent the building side wall 26 is the sill portion 45 which has placed therein the window assembly 46 in the manner shown.

The side wall portion 30 is also provided with a door opening within which is positioned a slidable door member 47 which includes the upper window portion 48 so as to form all around the assembly 22 a band of windows so that an attendant standing inside the assembly may have a clear view of the adjacent driveway.

Figure 4:
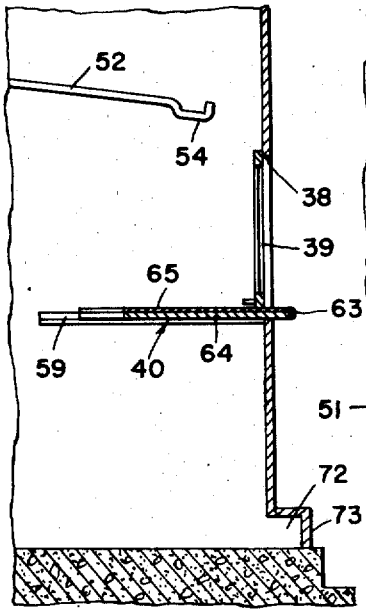
Fig. 4 is a vertical section taken substantially along the plane of section line 4—4 of Fig. 2.
Figure 3:
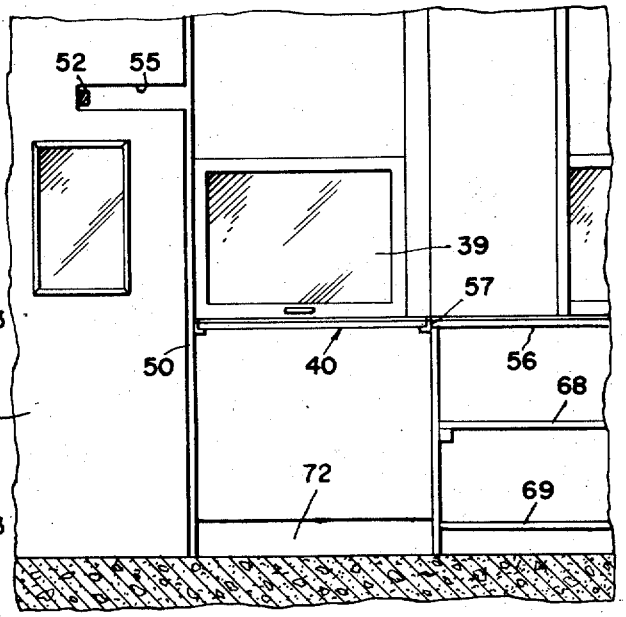
Fig. 3 is an inside elevational view of the assemblage shown in Fig. 1.
Figure 2:
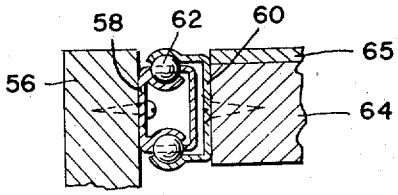
Fig. 2 is a horizontal sectional view taken through the assemblage shown in Fig. 1.

Referring now more particularly to Figs. 2, 3 and 4, it will be noted that the side wall 26 of the building is interrupted to provide an entranceway 49 into the interior of the assembly 22 and that a portion of the assembly is separated from the remainder thereof by the provision of a partition wall 50 which extends perpendicular to the front wall 27 and has associated therewith a sliding door member 51 which moves along the inner surface of the side wall 26. An inclined hanger rack 52 is suitably suspended so as to extend into the partitioned chamber 53 and the free end of this hanger terminates in a hook portion 54, the free end being the lower-most end of the rack. The sliding door 51 is provided with a slot 55 extending inwardly from one edge thereof to allow the door to operate with the rack in place.

The hanger rack is particularly useful in connection with laundry and cleaning establishments to permit garments to be slid along the rack to position within the chamber 53 so that a customer may have ready access thereto by opening the sliding door 47 in the side wall 30, thus placing the garment to be picked up in a most advantageous and convenient position. Of course, the rack may also be used by a customer to hang a garment which he is leaving for purpose of being cleaned.

The other portion of the assembly 22 is provided with a top shelf member 56 which extends from the wall 26 and terminates along one edge 57 in spaced parallelism with the surface of the partition wall 50. This edge 57 is provided with a track member 58 and a like track member 59 is provided in alignment therewith on the partition wall 50 so as to slidably receive therebetween the previously mentioned counter member 40.

Figure 6:
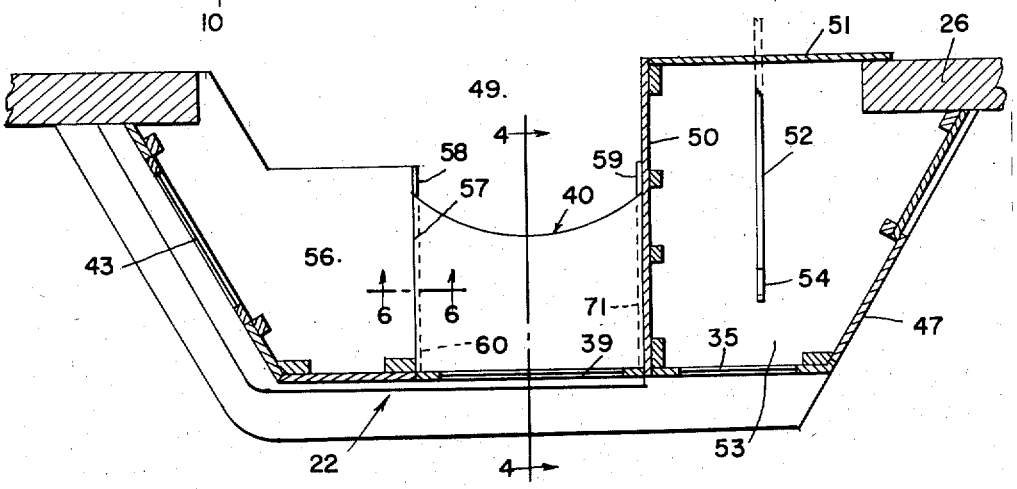
Fig. 6 is a sectional view taken substantially along the plane of section line 6—6 in Fig. 2 showing in enlarged detail the construction of the sliding counter and its mounting.

The opposite sides of the counter member 40 are provided with rail members 60 and 71 and the ball members 62 are positioned between overlapping edge portions of the various track and rail members in the manner most clearly shown in Fig. 6 to provide for free sliding movement of the counter from the initial position shown in Fig. 2 to a projected portion wherein the outer edge thereof which is provided with a rubber bumper member 63 engages the side of an automobile parked adjacent the assembly 22. The counter 40 is preferably constructed of a base portion 64 formed of wood or the like which is covered by a layer of linoleum 65 or similar material and the upper surface thereof is preferably disposed flush with the upper surface of the counter member 96 as will be most readily apparent in Fig. 3.

The series of vertically spaced shelf members 68 and 69 may be provided beneath the counter 56, as shown in Fig. 3, these various shelf members providing convenient storage space for articles.

The height of the sliding counter 40 is preferably such that when projected, the rubber bumper member 63 thereon will engage an automobile at a point substantially at the lower edge of the side windows thereof so that an article placed upon the counter, when it is in its normal position, will, when the counter is projected, be within convenient grasp of the vehicle operator without opening the automobile door or without requiring the operator to step from the vehicle. Thus, the attendant within the assembly 22 need never leave such assembly and the operator of the vehicle also is not usually required to leave his vehicle either, although it may be necessary to do so in case he wants to pick up or leave an article of clothing within the chamber 53. In this event, he need only position his car so that when he steps from the same, he will be close to the sliding door 47 so that he may open the same and reach inside the chamber 53.

The inner edge of the counter 40 is preferably curved in the manner shown. In actual operation, the goods are placed adjacent the outer edge of the counter and the attendant merely walks forward to push the slidable counter outwardly so that the goods are within reach of the customer sitting within his automobile. Since, at times, it may be required of the attendant to push the slidable counter substantially its full extent of outward projection, an outwardly projecting foot space 72 is provided in the manner shown most clearly in Fig. 4, this space being provided by the outwardly offset portion 73 as will be clearly evident.

Figure 7:
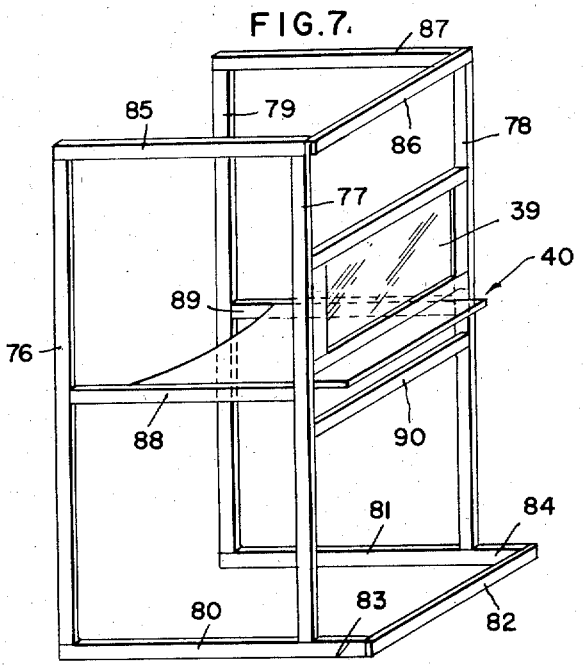
Fig. 7 is a perspective view of the prefabricated unit.

Referring now more particularly to Fig. 7, a prefabricated unit is shown which may be manufactured and sold as a unit for the purpose of permitting a customer to set up business practice in the manner hereinbefore described. The prefabricated unit consists essentially of a framework in which there is provided a sliding window and an associated slidable counter member and, when building a structure as for example that which is shown in Fig. 1, the prefabricated unit would be positioned as is substantially indicated by the dotted lines 74 and 75 in Fig. 1. Of course, it is to be realized that the prefabricated unit need not be associated with the specific structure shown in Fig. 1 and, in fact, the prefabricated unit may be so related to the remaining of the building structure that its front face is substantially flush with the building wall although it has been found that the most advantageous and convenient positioning of the slidable window and slidable counter is in a position spaced somewhat outwardly from the adjacent building wall. This latter positioning is more convenient for the customer inasmuch as it is easier to park an automobile adjacent such a protruding structure than it is to park the automobile closely adjacent to the flush construction. However, the prefabricated unit, in some instances, can be placed within an existing wall opening with a minimum of expense and, of course, it is readily adaptable to such positioning.

The unit as shown in Fig. 7 consists of the four corner uprights 76, 77, 78 and 79, which uprights are interconnected at their lower ends by the side stringers 80 and 81 and the transverse front piece 82. Preferably, the forward ends of the side stringers 80 and 81 project beyond the uprights 77 and 78 as indicated by the reference numerals 83 and 84 with the transverse front piece 82 connected to the terminal portions thereof to readily accommodate for the construction of the foot space 72 previously described. However, it can be appreciated that this particular construction is not absolutely necessary inasmuch as the foot space can be readily built into the finished unit without this specific construction. The upper ends of the uprights may be interconnected by the various cross members 85, 86 and 87 although it is contemplated that the provision of such cross members may be omitted inasmuch as the upper ends of the uprights will of course be tied into the finished building structure and will consequently be properly supported in the finished structure. However, it is extremely important in the prefabricated unit to provide the intermediate side pieces 88 and 89 which are provided at a suitable height for accommodation of the slidable counter member 40. These intermediate side pieces 88 and 89 carry the previously mentioned rail members 60 and 71 for the purpose of slidably supporting the counter member 40. The details of construction of the counter member 40 in the prefabricated unit shown in Fig. 7 are substantially identical to the details previously described.

The uprights 77 and 78 are interconnected across the front by the cross member 90 which is disposed somewhat below the undersurface of the slidable counter 40. Above the counter member 40 and on the opposing surfaces of the uprights 77 and 78, are provided any convenient channel means for slidably supporting the window member 39. Of course, as in the previously described construction, the normal innermost position of the movable counter 40 is such as to permit the forward edge thereof to project a slight amount outwardly of the window 39 and the window 39, when in closed position, rests upon the upper surface of the counter member. Also, as previously discussed, the prefabricated unit shown in Fig. 7 can be utilized as a base around which the structure such as that shown in Fig. 1 is built and when thus utilized, the prefabricated unit will be positioned substantially as indicated by the dotted lines 74 and 75 in Fig. 1.

Figure 8:
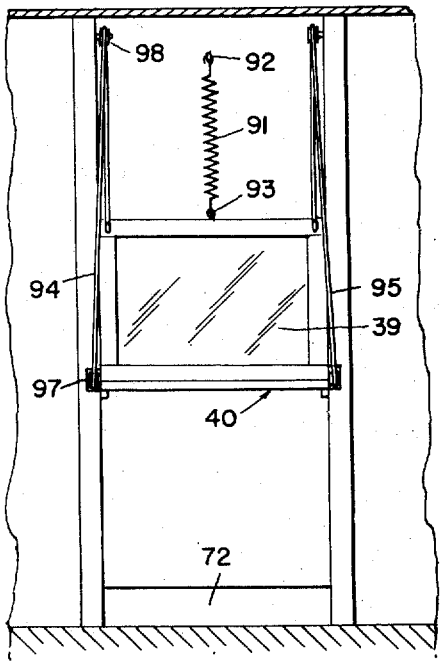
Fig. 8 is a sectional view showing a modified form of the invention.
Figure 9:
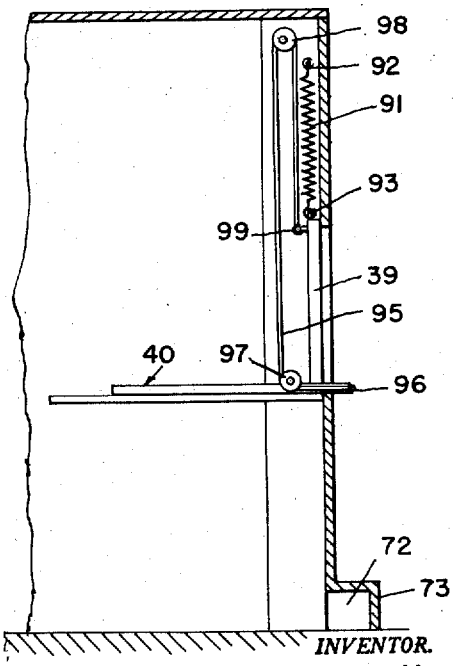
Fig. 9 is a vertical section taken substantially along the plane of section line 9—9 in Fig. 8 and showing further details of the modified construction.

With reference now more particularly to Figs. 8 and 9 wherein a modified form of construction is shown, it will be noted that the counter 40 is slidably supported in the manner previously described or by suitable equivalent mechanism and the slidable window 39 is also provided with means for vertical sliding movement. However, in the modified construction, there is a physical connection between the counter and the window such that the counter, when retracted, will permit the window 39 to assume the closed position as shown in Figs. 8 and 9. Moreover, the construction is such that when the counter is projected outwardly, the window automatically opens to permit access through the window opening and, of course, permit the articles placed on the counter to be projected outwardly of the building structure.

The particular construction utilized consists of a counterbalancing device, which counterbalances a substantial part of the window weight when the same is in closed position so as to require a minimum effort to raise the same and includes a physical connection which, in this case, is shown to be in the form of a cable or rope system for opening the window as the counter is pushed outwardly and permitting the window to close automatically when the counter is retracted. The counterbalancing device may take the form of a tension spring 91 which is connected at one end to the building structure as indicated by the reference character 92 and at its other end to the upper edge of the window as indicated at 93. Any convenient form of counterbalancing device may be utilized. A pair of cables 94 and 95 are connected at one end to points adjacent the forward edge of the counter as indicated by the reference character 96 in Fig. 9 and these cables extend rearwardly therefrom and are trained about pulley members 97 which are rotatably mounted on the building structure and the cables then project in a vertical direction over the pulleys 98 and thence downwardly to points of connection 99 adjacent the upper edge of the window 39. Thus, it will be clearly seen that when the counter is projected outwardly from the positions shown in Figs. 8 and 9, the window 39 will be moved vertically by means of the cables 94 and 95 and the window will automatically close when the counter is retracted to the position shown in Figs. 8 and 9.

I claim:

1. In a drive-in type building construction, an outside wall portion having an opening therein, a movable window positioned in said opening, a horizontally disposed counter member slidably mounted in said building construction for movement through said opening between a retracted position disposed substantially wholly within the building and a projected position wherein said counter member is projected outwardly through the opening, and there being a corridor leading up to said wall portion behind the counter when the same is in its projected position so that an attendant within the building may take a position just inside the wall portion with the length of the counter bridging the span between such attendant and a customer seated in an automobile outside the building.

2. The assembly as defined in claim 1 wherein means is provided interconnecting said counter member and said window for opening the latter as the counter member is moved to its projected position.

3. In a drive-in type building construction, an outside wall portion having an opening therein, a movable window positioned in said opening, a horizontally disposed counter member, means connected to and extending inwardly from said wall portion and engaging the opposite side edges of said counter member and slidably supporting the same for movement through said opening between a retracted position disposed substantially wholly within the building and a projected position wherein the counter member is projected outwardly through the opening, said means and the inner surface of the wall portion between such means defining a stall into which an attendant within the building may advance to move the counter member to its projected position with the length of the counter bridging the space between such attendant and a customer seated in an automobile outside the building.

4. The assembly as defined in claim 3 wherein means is provided interconnecting said counter member and said window for opening the latter as the counter member is moved to its projected position.

5. A drive-in type building construction as defined in and by claim 1 wherein the dimensions of the window are such that when opened immediately above the counter member, a package of laundry or the like on the counter member may be moved from within the building to the exterior thereof or vice versa.

6. A drive-in type building construction as defined in and by claim 5 wherein there is a resilient bumper on the outer edge of the counter member so that if the automobile body structure at the window where the driver is seated is engaged it will not mar the engaged surface.

7. In a drive-in building structure including a vertical front wall, said front wall having a substantially centrally located rectangular opening therein, a vertically slidable window positioned in said opening, a fixed counter disposed at the level of the lower edge of said opening and secured to the interior of said front wall and having an edge extending perpendicular to said front wall and extending inwardly thereof from one lower corner of said opening, a guide rail secured to said one edge of the fixed counter, a second guide rail fixed to the building structure in spaced parallelism with the first mentioned guide rail and extending inwardly from the front wall from the other lower corner of said opening, a thin, flat, horizontally disposed movable counter member having an inner and an outer edge and opposite side edges slidably carried by said guide rails and supported solely thereby, said movable counter member being of substantially the same width as said opening and movable between a retracted position in which it is disposed within the building structure with its outer edge disposed substantially flush with the outer surface of said front wall and with its opposite side edges engaged along their lengths by said guide rails, and a projected position having its major portion extending outwardly beyond the outer surface of said front wall and supported in cantilever fashion only by that portion of the movable counter within the building structure engaged by said guide rails, and the space between said guide rails from top to bottom of said front wall being free and unobstructed except for the movable counter to allow an attendant within the building structure to engage his body against the inner edge of the movable counter and walk up to the inner surface of said front wall and slidably move the counter together with a package thereon outwardly through said opening to the projected position such that only the movable counter separates the attendant and a customer seated in an automobile outside the building structure.

8. A unit for converting a business establishment to the drive-in type, comprising an open framework including four corner uprights and means interconnecting the uprights, said means including a pair of horizontal side members disposed in spaced parallel relation, a counter member extending between said side members and having its opposite side edges slidably engaged therewith, a window member slidably mounted on the opposed faces of one pair of uprights, said window member lying in a vertical plane disposed transversely of the path of movement of said counter member, means for automatically sliding said window member to provide an opening above the counter member when the counter member is projected outwardly of said framework, the last mentioned means including flexible members connected at opposite ends to said counter member and said window member, and pulleys mounted on said framework over which said flexible members are trained.

*9. In a drive-in type building construction, an outside wall portion having an opening therein, a movable window positioned in said opening, a horizontally disposed counter member movably mounted in said building construction for movement through said opening between a retracted position disposed substantially wholly within the building and a projected position wherein said counter member is projected outwardly through the opening, and there being a work area leading to said wall-portion adjacent the counter so that when the same is in its projected position, an attendant within the building may take a position just inside the wall portion with the projected length of the counter bridging the span between the wall and a customer seated in an automobile outside the building.*

References Cited in the file of this patent or the original patent

UNITED STATES PATENTS

| | | |
|---|---|---|
| 475,013 | Hanley | May 17, 1892 |
| 936,551 | Moore | Oct. 12, 1909 |
| 1,218,530 | Decker | Mar. 6, 1917 |
| 1,583,836 | Ickis | May 11, 1926 |
| 1,590,700 | Roberts | June 29, 1926 |
| 1,757,955 | Dautrick | May 13, 1930 |
| 1,963,274 | Kothe | June 19, 1934 |
| 2,722,179 | Belew | Nov. 1, 1955 |

FOREIGN PATENTS

| | | |
|---|---|---|
| 271,392 | Germany | Mar. 11, 1914 |

OTHER REFERENCES

Architectural Record, August 1950, pp. 136 and 137.